March 29, 1960     M. ADAMEC ET AL     2,930,883
APPARATUS FOR AUTOMATIC ARC-WELDING CIRCULAR SEAMS
Filed Sept. 24, 1958
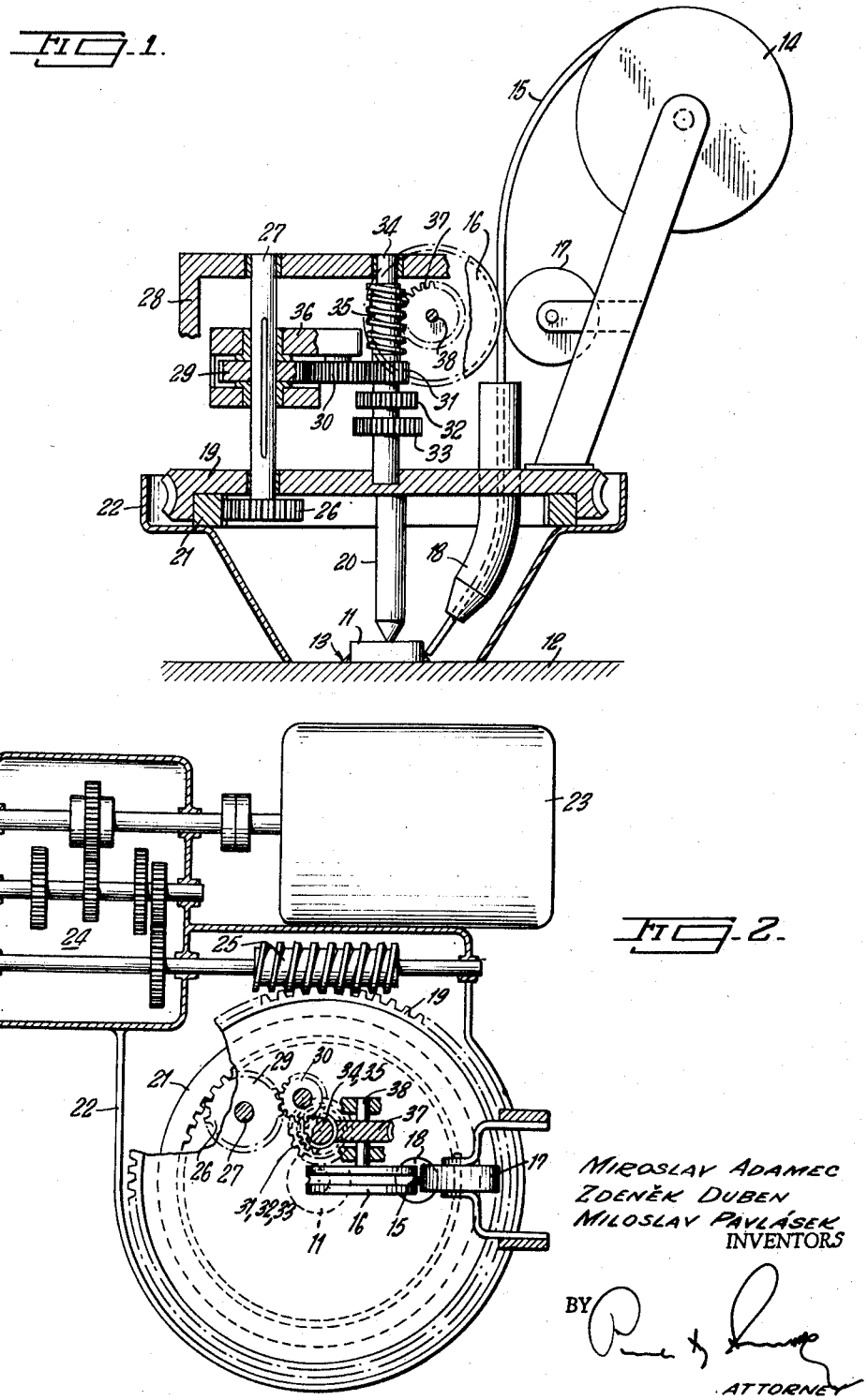
MIROSLAV ADAMEC
ZDENĚK DUBEN
MILOSLAV PAVLÁSEK
INVENTORS
BY
ATTORNEY United States Patent Office
2,930,883
Patented Mar. 29, 1960

2,930,883

APPARATUS FOR AUTOMATIC ARC-WELDING CIRCULAR SEAMS

Miroslav Adamec, Termesivy, and Zdenek Duben and Miloslav Pavlasek, Chotebor, Czechoslovakia, assignors to CKD Ceska Lipa Narodni Podnik, Ceska Lipa, Czechoslovakia, a corporation of Czechoslovakia Application September 24, 1958, Serial No. 762,970

Claims priority, application Czechoslovakia December 23, 1957

2 Claims. (Cl. 219—125)

In machine shop and repair work cylindrical bodies have often to be welded to a basic structure, this requiring circular seams. In known apparatus for such purpose the basic structure, whenever practicable, is clamped into a rotating device which turns said structure during the welding operation and the welding wire is supplied by a stationary feeding device. Such known apparatus can however not be used for welding small cylindrical bodies such as stay bolts to a large and heavy basic structure such as fire boxes in boilers of the locomotive type or of central heating installations, or the like. In such cases the welding of small cylindrical bodies to a large and heavy basic structure has hitherto been performed manually by an electric arc of coated electrodes which operation required skilled workers and was slow.

It is an object of our invention to provide an automatically operating welding apparatus permitting a quick and safe welding of cylindrical bodies of small diameter to a large and heavy basic structure.

The apparatus according to our invention welds automatically circular seams of small diameter by means of flux heated by an electric arc in an atmosphere of an inert gas such as carbon dioxide. The apparatus feeds the welding wire to the seam to be formed and at the same time rotates the feeding mechanism for the welding wire around the small cylindrical object to be attached by welding. The welding wire is in sufficient quantity wound upon and supplied from a reel or the like which follows in the rotational movement of said feeding mechanism. The dual movement of the welding wire namely its feed movement in longitudinal direction and the said rotational movement around the said small cylindrical body to be welded to a basic structure by means of a circular seam are both effected by a single electric motor this permitting to build a light weight and easily manageable apparatus efficiently usable for the specific purposes indicated above. Our new apparatus reduces the working time by almost 50% and may be used by unskilled workers.

The said and other objects of our invention will be more fully understood from the following specification when read with the accompanying drawing in which one embodiment of our new apparatus is shown.

In the drawing Fig. 1 shows more or less diagrammatically a top view, partly in section, of our new apparatus, and Fig. 2 a sectional view thereof.

The drawing shows the small cylindrical body 11 such as a bolt which is intended to be arc-welded by a circular seam 13 to a basic structure 12 such as a firebox. A reel 14 holds a supply of welding wire 15 which is fed by a feeder wheel 16 cooperating with a guide roll 17 to an adjustable mouth-piece 18 adapted to follow the circular seam 13. This mouth-piece 18 and said reel 14 are mounted upon a wormwheel 19 to rotate therewith about the axis of said bolt or the like 11 and of said seam 13. To this effect the wormwheel 19 is centered relative to the bolt 11 by means of a centering pin 20 engaging a center mark in said bolt and rests rotatably upon an inwardly toothed stationary ring 21 which is mounted in the apparatus frame 22. The mouth-piece 18 is so mounted in the wormwheel 19 that it may be turned or swung to adjust the location of its exit opening according to the circumference of said cylindrical body 11 and thus according to the diameter of the welding seam 13 to be made.

The welding wire 15 performs simultaneously two movements namely its feed movement lengthwise through the mouth-piece 18 toward the welding seam 13 and a circular movement with said mouth-piece 18 around the bolt 11 or the like following the shape of the circular seam 13. Both movements are derived from an electric motor 23 which rests upon the apparatus frame 22.

The motor 23 drives the wormwheel 19 over the change speed gear 24 and worm 25, and thus moves the mouth-piece 18 and the reel 14 together with the welding wire 15 circumferentially around the body 11 at controllable speeds.

The feeder wheel 16 causing the welding wire 15 to proceed lengthwise through the mouth-piece 18 toward the circular seam 13 is driven by the pinion 26 which engages the inwardly toothed ring 21 and is keyed upon the shaft 27 rotatably mounted upon the wormwheel 19 and in a casing 28 connected thereto. A toothed wheel 29 slidably mounted upon shaft 27 drives over an intermediate wheel 30 interchangeably one of the change speed wheels 31, 32, 33 which are keyed upon the shaft 34 of a worm 35 said shaft 34 being rotatably mounted in the wormwheel 19 and the casing 28. The said intermediate wheel 30 is rotatably supported by an arm 36 swingable on shaft 27. The worm 35 engages the wormwheel 37 which is keyed to the shaft 38 of the feeder wheel 16. The speed of the feeder wheel 16 is changed by causing the intermediate gear 30 to engage one or the other of the wheels 31, 32, 33. Such change is effected by conventional means such as a control lever not shown in the drawing. The speed changing gearing 29, 30, 31, 32, 33 is adapted to maintain a substantially constant feeding speed of the welding wire 15 relative to different diameters of the circular welding seam 13 to be formed.

The conventional electric circuit supplying the electric current to form the welding arc is not shown in the drawing.

Having shown and described one embodiment of our invention to illustrate the application of the principles thereof, it will be well understood that our invention may be otherwise embodied without departing from such principles and without avoiding the scope of the appended claims.

What we claim as our invention is:

1. An apparatus for arc-welding circular seams, comprising in combination a frame; an inwardly toothed ring member mounted in said frame and adapted to be placed above and coaxially to the circular seam to be formed; a wormwheel rotatably resting upon said ring; holding means storing a supply of welding wire mounted upon said wormwheel to rotate therewith; a mouth-piece for the welding wire adjustably mounted in said wormwheel to rotate therewith and adapted to guide the end of the welding wire toward the circular welding seam; feeding means continuously feeding welding wire from said holding means into and through said mouth-piece and mounted upon said wormwheel to rotate therewith; an electric motor mounted upon said frame; a first gearing including a worm between the motor and said wormwheel to drive the same; a pinion rotatably mounted upon said wormwheel and engaging the toothed ring; and a second gearing between said pinion and said feeding means to actuate the same.

2. An apparatus for automatic arc-welding circular seams, according to claim 1 wherein the said first and second drive gearings are controllable speed change gearings.

References Cited in the file of this patent

UNITED STATES PATENTS

| | | |
|---|---|---|
| 2,025,785 | Southgate | Dec. 31, 1935 |
| 2,847,558 | Mosny | Aug. 12, 1958 |

FOREIGN PATENTS

| | | |
|---|---|---|
| 743,555 | Great Britain | Jan. 18, 1956 |